United States Patent
Qiu et al.

(10) Patent No.: US 8,832,250 B2
(45) Date of Patent: Sep. 9, 2014

(54) METHOD AND SERVER FOR AGENT SERVICE APPLIED TO WIDGET

(75) Inventors: Zhihong Qiu, Shenzhen (CN); Haifang Fu, Beijing (CN); Jie Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 376 days.

(21) Appl. No.: 13/338,375

(22) Filed: Dec. 28, 2011

(65) Prior Publication Data

US 2012/0102179 A1    Apr. 26, 2012

Related U.S. Application Data

(63) Continuation of application No. PCT/CN2010/078438, filed on Nov. 5, 2010.

(30) Foreign Application Priority Data

Nov. 18, 2009  (CN) .......................... 2009 1 0109675

(51) Int. Cl.
*G06F 15/173* (2006.01)
*G06Q 30/06* (2012.01)

(52) U.S. Cl.
CPC ..................................... *G06Q 30/06* (2013.01)
USPC ........................................... 709/223; 709/203

(58) Field of Classification Search
CPC .............................. G06Q 30/06; G06Q 20/085
USPC ............................... 709/223–224, 203
See application file for complete search history.

(56) References Cited

U.S. PATENT DOCUMENTS

| | | | | |
|---|---|---|---|---|
| 8,595,186 | B1* | 11/2013 | Mandyam et al. ............. | 707/632 |
| 2007/0038934 | A1* | 2/2007 | Fellman ........................ | 715/700 |
| 2007/0101291 | A1* | 5/2007 | Forstall et al. ................ | 715/805 |
| 2009/0094339 | A1* | 4/2009 | Allen et al. .................... | 709/206 |

(Continued)

FOREIGN PATENT DOCUMENTS

| CN | 101193272 A | 6/2008 |
|---|---|---|
| CN | 101212792 A | 7/2008 |

(Continued)

OTHER PUBLICATIONS

International Search Report from the Chinese Patent Office for corresponding International Application No. PCT/CN2010/078438 mailed Feb. 10, 2011.

(Continued)

*Primary Examiner* — Philip B Tran
(74) *Attorney, Agent, or Firm* — Conley Rose, P.C.; Grant Rodolph; Nicholas K. Beaulieu

(57) ABSTRACT

A method for an agent service applied to a Widget is provided, where the method includes: receiving a service request for the Widget using an Application Programming Interface (API) initiated by a user terminal; forwarding the service request to an API service provider, and forwarding a response for the service request from the API service provider to the user terminal; collecting charging information generated by the Widget using an API service, and recording the collected charging information, where the charging information, together with a charging policy registered by the Widget, is used to perform uniform charging for the API service used by the Widget. An embodiment of the present invention further provides a server, which may reduce complicated user operation and bringing better user experience.

20 Claims, 8 Drawing Sheets

(56) References Cited

U.S. PATENT DOCUMENTS

| | | | | |
|---|---|---|---|---|
| 2009/0138579 A1* | 5/2009 | Jung | | 709/221 |
| 2009/0144066 A1 | 6/2009 | Van Luchene et al. | | |
| 2011/0055063 A1 | 3/2011 | Zhang et al. | | |
| 2014/0020068 A1* | 1/2014 | Desai et al. | | 726/4 |

FOREIGN PATENT DOCUMENTS

| | | |
|---|---|---|
| CN | 101217752 A | 7/2008 |
| CN | 101282227 A | 10/2008 |
| CN | 101562802 A | 10/2009 |

OTHER PUBLICATIONS

Min, et al., "Study of Mobile Widget Service", Journal of Telecommunication Network Technology, No. 2, pp. 27-30, (2009).

Foreign Communication From a Counterpart Application, PCT Application PCT/CN2010/078438, English Translation of Written Opinion dated Feb. 10, 2011, 4 pages.

Foreign Communication From a Counterpart Application, Chinese Application 200910109675.9, Chinese Office Action dated Jan. 31, 2013, 14 pages.

Foreign Communication From a Counterpart Application, Chinese Application 200910109675.9, Partial English Translation of Chinese Office Action dated Jan. 31, 2013, 27 pages.

Lihong, et al., "Research on Essential Factors About Operation of Mobile Internet and Business Model," China Telecomm Shanghai Research Institute, Apr. 8, 2009, pp. 17-20.

Ganfeng, et al., "Research on the Application of Mobile Widget Technology in the Mobile Value-Added Services," China Telecomm Shanghai Research Institute, Apr. 16, 2009, p. 21.

Ganfeng, et al., "Research on the Application of Mobile Widget Technology in the Mobile Value-Added Services," China Telecomm Shanghai Research Institute, Partial English Translation dated Apr. 16, 2009, 8 pages.

* cited by examiner

METHOD AND SERVER FOR AGENT SERVICE APPLIED TO WIDGET

CROSS-REFERENCE TO RELATED APPLICATIONS

This application is a continuation of International Application No. PCT/CN2010/078438, filed on Nov. 5, 2010, which claims priority to Chinese Patent Application No. 200910109675.9, filed on Nov. 18, 2009, both of which are hereby incorporated by reference in their entireties.

FIELD OF THE INVENTION

The present invention relates to the field of communications, and in particular, to a method and a server for an agent service applied to a Widget.

BACKGROUND OF THE INVENTION

A Widget is a small Web program of a client and may generally be called a Widget or a Widget. The Widget is capable of displaying and updating local or remote data and is generally packaged into one file to be downloaded, installed, and used by a client device.

The emergence of the Widget greatly changes service forms in a telecommunication network. Types of services in a traditional telecommunication network are limited. Generally, an operator provides each service with separate service sub-network, including a highly targeted charging network element. Characteristics of the services in the traditional telecommunication network are that few types exist; each type of service has a long operation period; the operator is in charge of development and operation of the services; and the development and operation of the services are investigated and researched strictly.

However, in a Widget mode, a final service in the form of Widget may be developed by a third party, especially a free developer. Telecommunication capability and a content platform provided by the operator are not provided for a user as a final product, but provided for the developer to call in the form of Application Programming Interfaces (APIs). The developer calls the APIs in the Widget service to create various novel services. Currently, in Internet and a telecommunication operation network, more and more service providers provide services in the form of APIs. For example, on the Programmableweb website, more than 1000 OpenAPIs are managed so far, where up to 57 types of OpenAPIs exist.

In the implementation of the present invention, the inventor finds that the prior art at least has the following problems. Each user may download multiple Widgets; each Widget may use multiple API services; and the API services are provided by different service providers. In this way, the user needs to perform communication interaction with numerous API service providers respectively, and when settlement is required, the numerous API service providers need to collect charging information respectively, and then perform charging settlement according to the collected charging information. This charge mode does not conform to user customs but increases the amount of complicated operation of the user and the API service providers.

SUMMARY OF THE INVENTION

Embodiments of the present invention provide a method and a server for an agent service applied to a Widget.

An embodiment of the present invention provides a method for an agent service applied to a Widget, where the method includes:

receiving a service request for the Widget using an API initiated by a user terminal;

forwarding the service request to an API service provider, and forwarding a response for the service request from the API service provider to the user terminal; and collecting charging information generated by the Widget using an API service, and recording the collected charging information, where the charging information, together with a charging policy registered by the Widget, is used to perform uniform charging for the API service used by the Widget.

Another embodiment of the present invention further provides a server for an agent service applied to a Widget. The server is communicatively connected to multiple user terminals and multiple API service providers respectively, and includes a service agent unit and a charging unit.

The service agent unit is configured to receive a service request for the Widget using an API initiated by a user terminal, forward the service request to an API service provider, and forward a response for the service request from the API service provider to the user terminal.

The charging unit is configured to collect charging information generated by the Widget using an API service and record the collected charging information after the service agent unit receives the service request, where the charging information, together with a charging policy registered by the Widget, is used to perform uniform charging for the API service used by the Widget.

BRIEF DESCRIPTION OF THE DRAWINGS

To make the technical solutions in the present invention or in the prior art clearer, the accompanying drawings for illustrating the embodiments of the present invention or the prior art are briefly introduced in the following. Apparently, the accompanying drawings in the following description are only a part of the embodiments, and person of ordinary skill in the art may obtain other drawings according to these accompanying drawings without any creative effort.

DETAILED DESCRIPTION OF THE EMBODIMENTS

The technical solutions in the present invention are clearly and fully described in the following with reference to the accompanying drawings. Apparently, the embodiments to be described are only a part rather than all of the embodiments of the present invention. All other embodiments obtained by persons of ordinary skill in the art based on the embodiments of the present invention without creative efforts shall fall within the protection scope of the present invention.

In this embodiment, multiple terminals installed with Widgets may be communicatively connected to one server, where the server is communicatively connected to multiple API service providers and communicatively connected to an operator, and the API service providers are not connected to the operator. In this embodiment, when a user uses the Widget, if a service provided by an API service supplier or an API service provider needs to be used, the user initiates a service request to the server through the terminal installed with the Widget, forwards the request to the corresponding API service provider through the server, and returns a response from the API service provider for the request to the Widget terminal.

In this embodiment, when the user uses the Widget, the user and the server first perform uniform supply settlement for charges generated by using various charge APIs. The server and the API service provider supply settlement for use charges of the charge APIs generated by the server forwarding the service request.

In this embodiment, after the Widget completely designed by a developer is uploaded to the server for the user to download, the Widget needs to be registered on the server, or an administrator of the server registers the Widget, where information to be registered includes a Widget ID, a Widget charging policy, and a charge API service used by the Widget. Definitely, the charge API service used by the Widget includes an API ID used by the Widget. Meanwhile, the user also needs to register on the server to ensure that the user has a use right.

Definitely, each API service provider also needs to register on the server.

In this embodiment, a uniform charging process includes acting as an agent of a user to forward the service request for using the API service, and regularly triggering uniform charging settlement of the involved charge for using the API. In this embodiment, the user initiates the service request, and the server returns the response from the API service provider, which means that the user is using the API, and the charge for using the API is generated. When acting as the agent to forward the service request of the user, the server collects relevant charging information. In this embodiment, the process of regularly triggering the uniform charging settlement of the involved charge for using the API include a process of uniform settlement of the user and a process of uniform settlement of the API service provider.

Figure 1:
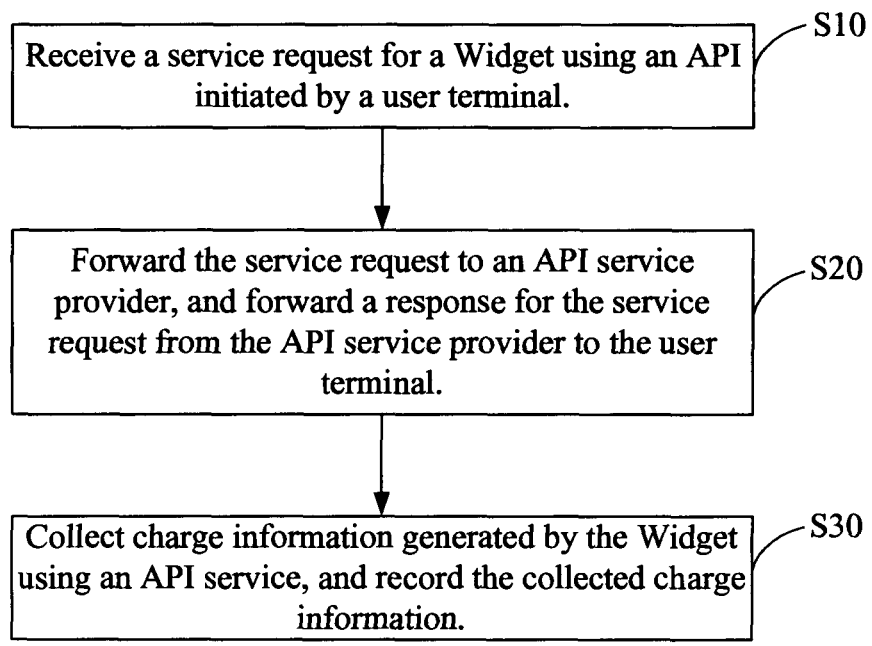
FIG. 1 is an overview flow chart of a method for an agent service applied to a Widget according to an embodiment of the present invention.

In this embodiment, FIG. 1 is an overview flow chart of a method for an agent service applied to a Widget according to an embodiment of the present invention. In this embodiment, the method includes the following steps.

Step S10: Receive a service request for the Widget using an API initiated by a user terminal.

Step S20: Forward the service request to an API service provider, and forward a response for the service request from the API service provider to the user terminal.

Step S30: Collect charging information generated by the Widget using an API service, and record the collected charging information, where the charging information, together with a charging policy registered by the Widget, is used to perform uniform charging for the API service used by the Widget.

In this embodiment, a server acts as an agent to uniformly collect the charging information generated when the Widget uses the API service, so the API service provider does not need to collect the charging information for each API service respectively. The server acts as the agent to uniformly forward the request for the user using the API service to the API service provider, and forward the response for the service request from the API service provider to the user, so the user does not need to perform communication interaction with multiple API service providers respectively, thereby reducing complicated user operation and bringing a better user experience.

In this embodiment, when the charging information is collected, the collected charging information may also be employed to perform uniform charging for the API service used by the Widget. In this embodiment, the method may further include the following step.

The uniform charging settlement is performed for the API service used by the Widget according to the recorded collected charging information and the charging policy registered by the Widget.

Definitely, if the uniform charging settlement needs to be performed for the API service provider, the method may further include the following step.

The settlement is performed for the API service provider according to the collected charging information and an API settlement manner registered by the API service provider. It should be noted that, the steps of performing the charging settlement for the API service used by the Widget and the API service provider are not necessary. The server may only need to complete request forwarding and charging information collection. The charging settlement by employing the charging information may be regarded as an additional function of the server.

Figure 1A:
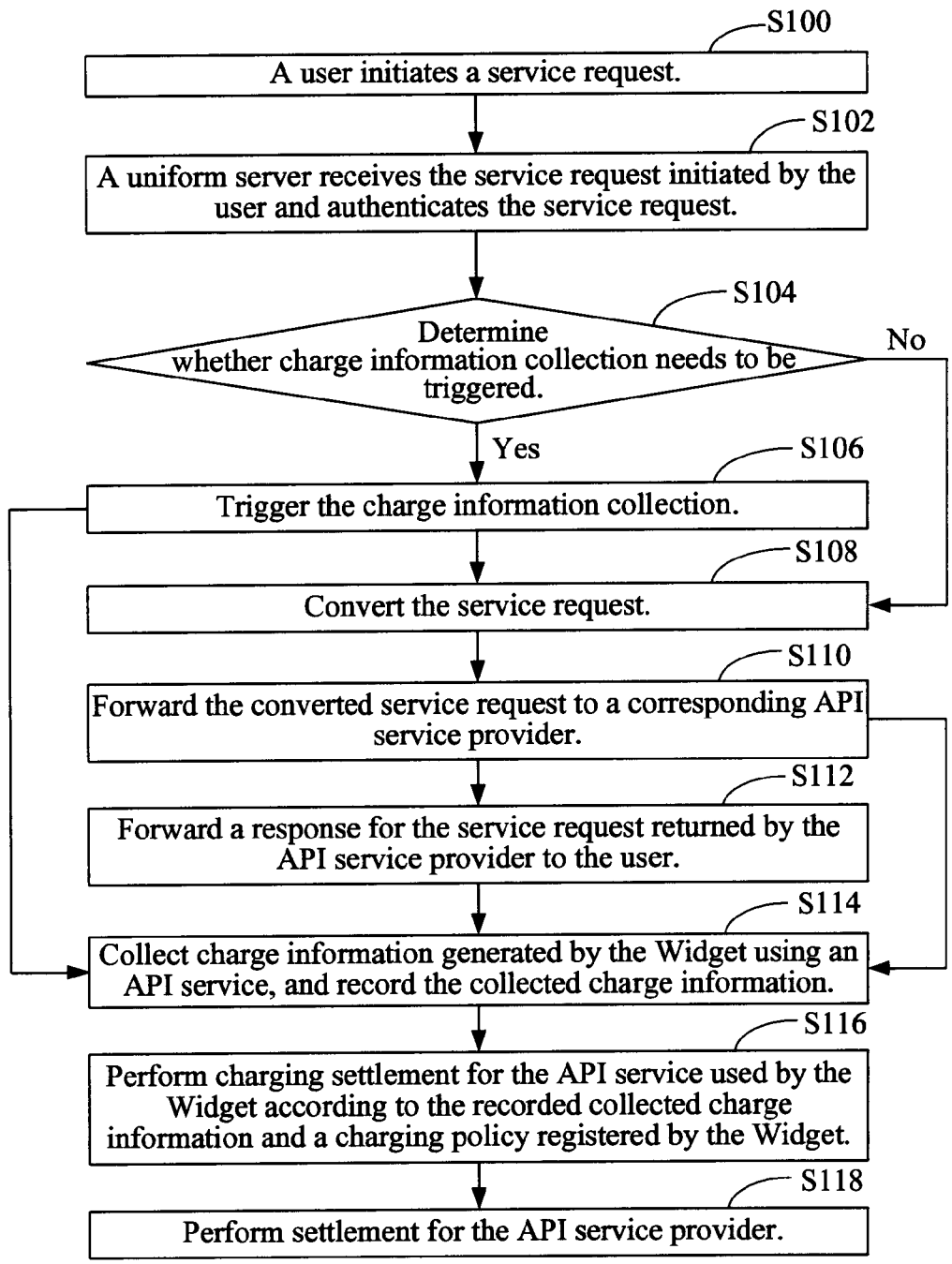
FIG. 1A is a specific flow chart of a method for an agent service applied to a Widget according to an embodiment of the present invention.

FIG. 1A is a specific flow chart of a method for an agent service applied to a Widget according to an embodiment of the present invention.

In this embodiment, step S100 is as follows: A user of a user terminal initiates a service request for a Widget using an API. In this embodiment, the service request includes authentication information, where the authentication information includes a user ID, a Widget ID, and an API ID used by the Widget. In this embodiment, the Widget ID is an ID of the Widget used by the user. The API ID is an ID of the API that the user needs to request using when the user uses the Widget. Definitely, the authentication information may include Internet Protocol (IP) information of the user. Definitely, the user terminal may be installed with one or more Widgets.

Step S102: A server receives the service request initiated by the user and authenticates the service request. In this embodiment, an authentication process may include the following steps.

Step A: Determine that the user is a registered user of the server and has a right to use the server according to the user ID in the service request. In this embodiment, it may be queried whether the user ID exists in user IDs registered on the server.

Step B: Determine that the Widget used by the user is already registered on the server according to the Widget ID in the service request. In this embodiment, it may be queried whether the Widget ID exists in Widget IDs registered on the server.

Step C: Compare the Widget ID and the API ID in the service request with registration information of the Widget, and determine that the Widget in service request has a right to use the API. The registration information of the Widget includes information of a Widget ID and a charge API service used by the Widget, and the charge API service used by the Widget includes the ID of the API used by the Widget, so the Widget ID in the service request is compared with the Widget ID in the registration information, and the API ID in the service request is compared with the API ID in the charge API service used by the Widget. If the Widget IDs are the same and the API IDs are the same, it may be determined that the Widget in service request has the right to use the API.

In this embodiment, after authentication succeeds, step S104 is performed to determine whether charging information collection needs to be triggered. In this embodiment, the collection may be performed according to a charging policy of the Widget. In this embodiment, the charging policy of the Widget may include convergent charging, uniform charging, charging according to the use times, charging according to duration, charging according to monthly packages, and a service free of charge. In this embodiment, if the current charging policy of the Widget is charging according to monthly packages and the service free of charge, the charging information collection does not need to be triggered, and step S108 is performed. If the current charging policy of the Widget is convergent charging, uniform charging, charging according to the duration, or charging according to the use times, the charging information collection needs to be triggered, and step S106 is performed.

Step S106: Trigger the charging information collection. After an action of triggering the charging information collection, step S108 and step S114 start to be performed.

Step S108: Convert the service request of the user. In this embodiment, a conversion manner is: removing the authentication information in the service request of the original user, adding authentication information negotiated between the server and the API service provider. Two different manners may be as follows.

A first manner is authentication through a user name and a password, where the user name and the password registered by the server with the API service provider are added in the service request.

A second manner is authentication through an IP address, where in the service request, the IP information of the original user is removed, and IP information of the server is added.

Step S110: Forward the converted service request to the corresponding API service provider. In this embodiment, after receiving the service request, the API service provider returns a response for the service request to the server. In this embodiment, when step S110 is performed, step S114 may also be performed. If charging is performed according to the use times, the number of event streams of forwarding the service request to the API service provider in step S110 needs to be recorded.

Step S112: Forward the response for the service request returned by the API service provider to the user.

The response is information generated by the API service provider processing the service request. For example, if the user initiates a service request for a weather forecast, the API service provider returns a result of the weather forecast to the user.

Step S114: Collect charging information generated by the Widget using the API service, and record the collected charging information. In this embodiment, the charging information may include the user ID, the Widget ID, and the API ID used by the Widget. Definitely, the charging information may further include service starting time and service ending time, the number of event streams of forwarding the service request to the API service provider, and the number of event streams of forwarding the response for the service request to the user.

Step S116: Perform charging settlement for the API service used by the Widget according to the recorded collected charging information and the charging policy registered by the Widget. In this embodiment, the charge generated by using the API service when the user uses the Widget is settled according to the collected charging information and the charging policy registered by the Widget, so as to avoid the situation that the user needs to perform settlement for each API service provider respectively, thereby reducing complicated operation of the user.

In this embodiment, in order to implement that the server performs settlement for the API service provider, the method may further includes the following.

Step S118: Perform the settlement for the API service provider.

According to the technical solutions provided in this embodiment, the server acts as an agent to settle the charge generated by using the API when the user uses the Widget according to the collected charging information and the charging policy registered by the Widget, and acts as an agent to perform the settlement for the API service provider, so as to avoid the situation that the user needs to perform the settlement for each API service provider respectively, thereby reducing complicated operation of the user and bringing better user experience.

Figure 2:
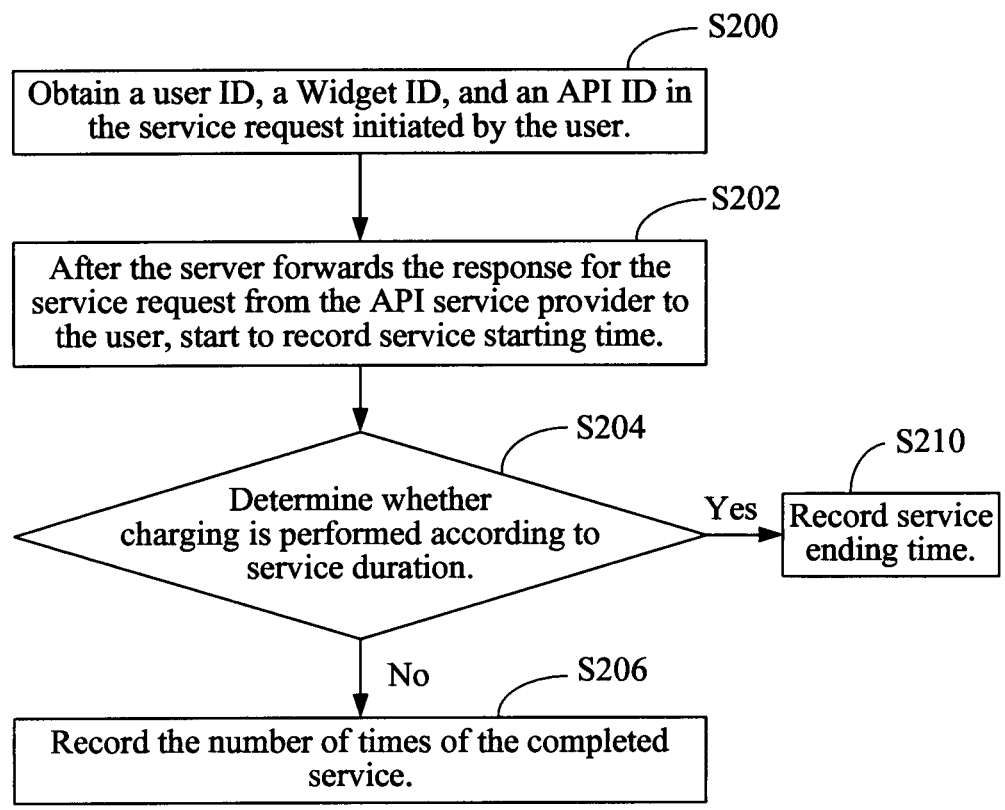
FIG. 2 is a specific flow chart of step S114 in FIG. 1A according to the embodiment of the present invention.

FIG. 2 is a specific flow chart of step S114 in FIG. 1A according to the embodiment of the present invention.

After the charging information collection is triggered, in this embodiment, in step S200: the user ID, the Widget ID, and the API ID used by the Widget in the service request initiated by the user are obtained.

Step S202: After the server forwards the response for the service request from the API service provider to the user, the service starting time starts to be recorded. In this embodiment, after the response for the service request from the API service provider is forwarded to the user, it may be understood that the API service provider starts to provide the service. In this embodiment, it may also be understood that, after step S112 in FIG. 1 is performed, step S202 in FIG. 2 starts to be performed, that is, the service starting time starts to be recorded.

Step S204: Determine whether the charging is performed according to service duration.

In this embodiment, if it is determined that the charging is performed according to the service duration, step S210 is performed, that is, the service ending time is recorded. In this embodiment, the recorded service ending time is a time for the API service provider to finish providing the service.

If it is determined that the charging is not performed according to the service duration, step S206 is performed, that is, the number of times of the completed service is recorded. In this embodiment, the number of times of the completed service includes the number of event streams of forwarding the service request to the API service provider, and the number of event streams of forwarding the response for the service request to the user. In this embodiment, the number of event streams of forwarding the service request to the API service provider in step S110 may be recorded. The number of event streams of forwarding the response for the service request to the user in step S112 may be recorded. In this embodiment, if the charging is not performed according to the service duration, the charging may be performed according to the number of use times. At this time, the number of event streams of forwarding the service request to the API service provider and the number of event streams of forwarding the response for the service request to the user need to be regarded as the charging information. In this embodiment, if the number of event streams of forwarding the service request to the API service provider equals the number of event streams of forwarding the response for the service request to the user, the user obtains the service of the API service provider for each service request, or it may be understood that, for each request, one service is completed. If the number of event streams of forwarding the service request to the API service provider does not equal the number of event streams of forwarding the response for the service request to the user, it is noted that a part of services are not provided.

In this embodiment, the information obtained and recorded in the foregoing steps may be regarded as original charging information, that is, the collected charging information, for generating a bill.

Figure 3:
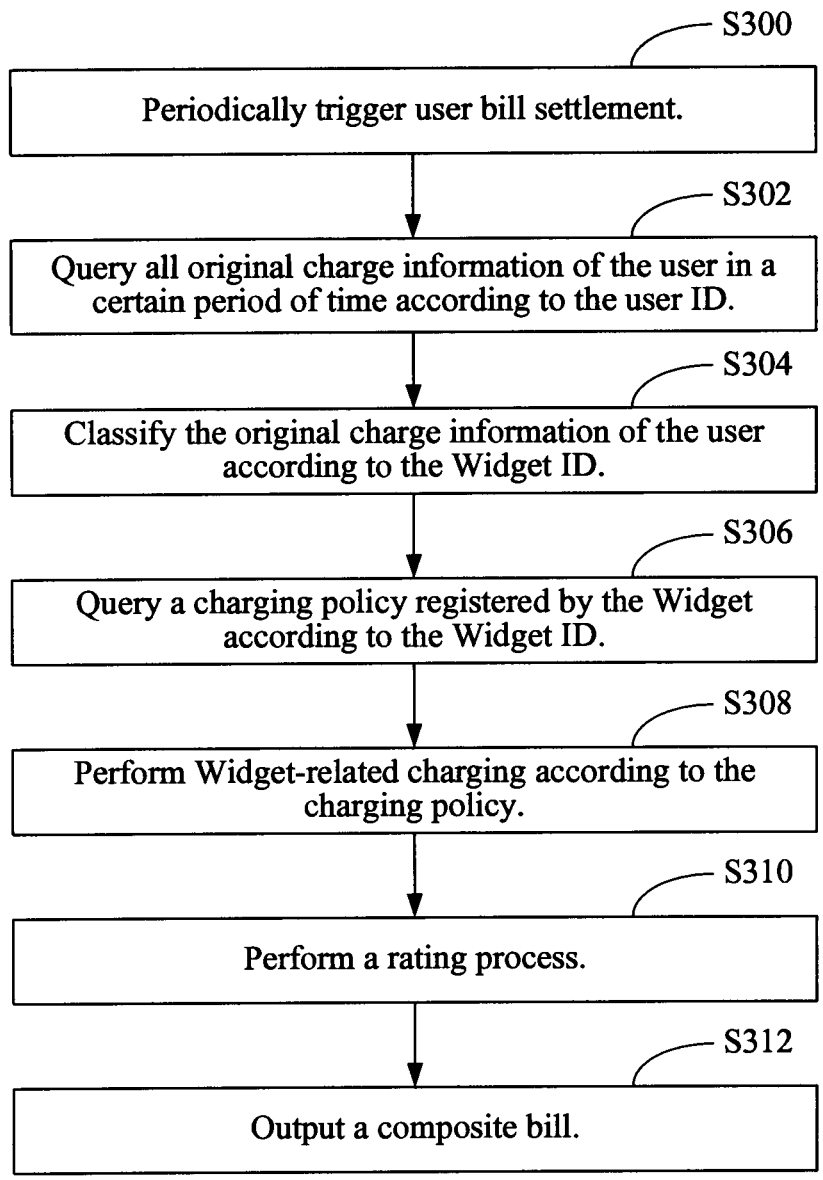
FIG. 3 is a flow chart of implementation of step S116 in FIG. 1A according to the embodiment of the present invention.

FIG. 3 is a flow chart of implementation of step S116 in FIG. 1A according to the embodiment of the present invention.

In this embodiment, step S300 is as follows: Regularly or periodically trigger user bill settlement.

Step S302: Query all original charging information of the user in a certain period of time according to the user ID.

Step S304: Classify the original charging information of the user according to the Widget ID. In this embodiment, each type of Widget is assigned with the charging information corresponding to the Widget.

Step S306: Query a charging policy registered by the Widget according to the Widget ID.

Step S308: Perform charging settlement for the API service used by the Widget according to the charging policy.

In this embodiment, after the charging settlement is performed, the method may further include the following.

Step S310: Perform a rating process. In this embodiment, the rating process is performed on charging settlement information for the API service used by the Widget.

Step S312: Output a composite bill. In this embodiment, here, the bill may include the user ID, the used Widget ID, the used API ID, and a generated charge amount. In this embodiment, the server may also output the bill of the user to the user according to a bill query request of the user.

In this way, for the user, a consumed amount is clear at a glance.

In this embodiment, after step S308 is performed, settlement information of the API service used by the Widget is obtained. The settlement information includes the user ID and the amount. The server may also deduct the charge amount generated by the user using the Widget according to the charging settlement information.

In this embodiment, two implementation manners may exist.

First manner: If a charge account of the user exists in the server, the server may deduct the charge amount generated by the user using the Widget from the charge account of the user.

Second manner. Send the charging settlement information to an operator, so as to notify the operator of deducting the charge amount of the user from an operator account, where the settlement information includes the user ID, a server ID, and the amount; and receive the charge amount of the user deducted by the operator from the operator account.

In this embodiment, the server may regard the deducted charge amount generated by the user using the Widget as a revenue amount of the server.

Figure 4:
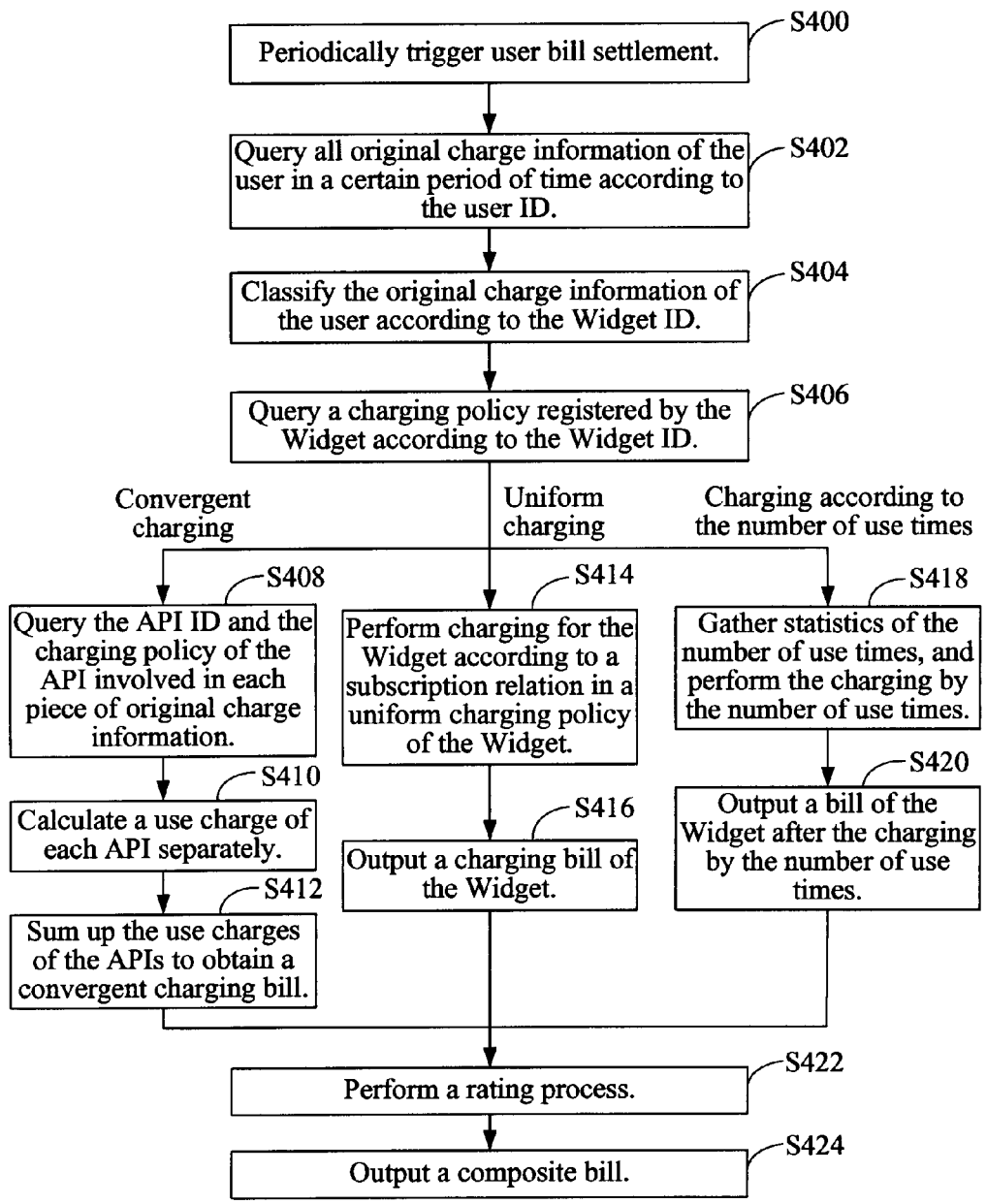
FIG. 4 is a flow chart of specific implementation of FIG. 3 according to the embodiment of the present invention.

FIG. 4 is a flow chart of specific implementation of FIG. 3 according to the embodiment of the present invention.

In this embodiment, step S400 is as follows: Regularly or periodically trigger user bill settlement.

Step S402: Query all original charging information of the user in a certain period of time according to the user ID.

Step S404: Classify the original charging information of the user according to the Widget ID. In this embodiment, each type of Widget is assigned with the charging information corresponding to the Widget.

Step S406: Query a charging policy registered by the Widget according to the Widget ID.

In this embodiment, the charging policy is described by taking the convergent charging, the uniform charging, and charging according to the number of use times. The embodiment of the present invention is not limited to the three charging policies.

If it is queried according to the Widget ID that the charging policy of the Widget is the convergent charging, step S408 is performed. If it is queried according to the Widget ID that the charging policy of the Widget is the uniform charging, step S414 is performed. If it is queried according to the Widget ID that the charging policy of the Widget is the charging according to the number of use times, step S418 is performed. Description is given in the following.

If the charging policy is the convergent charging, in this embodiment, step S408 is as follows: Query the API ID and the charging policy of the API involved in each piece of original charging information. In this embodiment, a function of the convergent charging is that the server outputs a composite bill to the user, that is, the server is capable of outputting a bill including a charging condition of each Widget to the user.

Step S410: Calculate a use charge of each API respectively.

Step S412: Sum up the use charges of the APIs to obtain a convergent charging bill. In this embodiment, if required, relevant discount calculation may be performed.

In this embodiment, the uniform charging refers to a policy for charging according to a use condition of the Widget. If the charging policy is the uniform charging, after the charging is performed according to the Widget, the charging is not performed for the use of the API service generated by using the Widget again. Through this charging manner, the user can obtain the service according to the Widget, and meanwhile pay a fee according to the Widget, thereby avoiding bad experience caused by the fact that a service object is different from a charging object. In this embodiment, it may be understood that, the Widget may be subscribed according to the policy of the Widget, such as charging according to monthly packages, charging according to yearly packages, charging according to duration, that is, a subscription relation exists in a uniform charging policy of the Widget.

Step S414: Perform charging for the Widget according to the subscription relation in the uniform charging policy of the Widget. In this embodiment, the charging is performed according to the subscription relation, so the charging is not performed for the use of the API service generated by using the Widget again.

Step S416: Output a charging bill of the Widget.

Definitely, if the charging policy is the charging according to the number of use times, the service request initiated in each use process needs to include a session ID, that is, a session in each use process includes the same session ID. Description may be given by referring to the following two examples, that is, two implementation manners exist, where one manner is additionally sending a message when the Widget is opened, and the other manner is additionally sending a message when the Widget is closed.

Example of the message initiated when the Widget is opened:

```
{
    "user_id": "someone@huawei.com",
    "engine_id": "widbeans.com",
    "ts": 1193222693000,
    "type": "start_widget",
    "body": { "widget_id": "rss_news1"}
}
```

Example of the message initiated when the Widget is closed:

```
{
    "user_id": "someone@huawei.com",
    "engine_id": "widbeans.com",
    "ts": 1193222693000,
    "type": "end_widget",
    "body": { "widget_id": "rss_news1"}
}
```

It may be seen that, the messages initiated when the Widget is opened and closed include the same session ID.

Step S418: Gather statistics of the number of use times, and perform the charging according to the number of use times. In this embodiment, the number of use times may be the number of the event streams in step S206 and step S208.

Step S420: Output a bill of the Widget after the charging according to the number of use times.

In this embodiment, after step S412, step 416, or step 420 is performed, step S422 may further be performed.

Step S422: Perform a rating process.

Step S424: Output a composite bill. In this embodiment, the user may query a charge bill generated by using the API service according to requirements.

Figure 5:
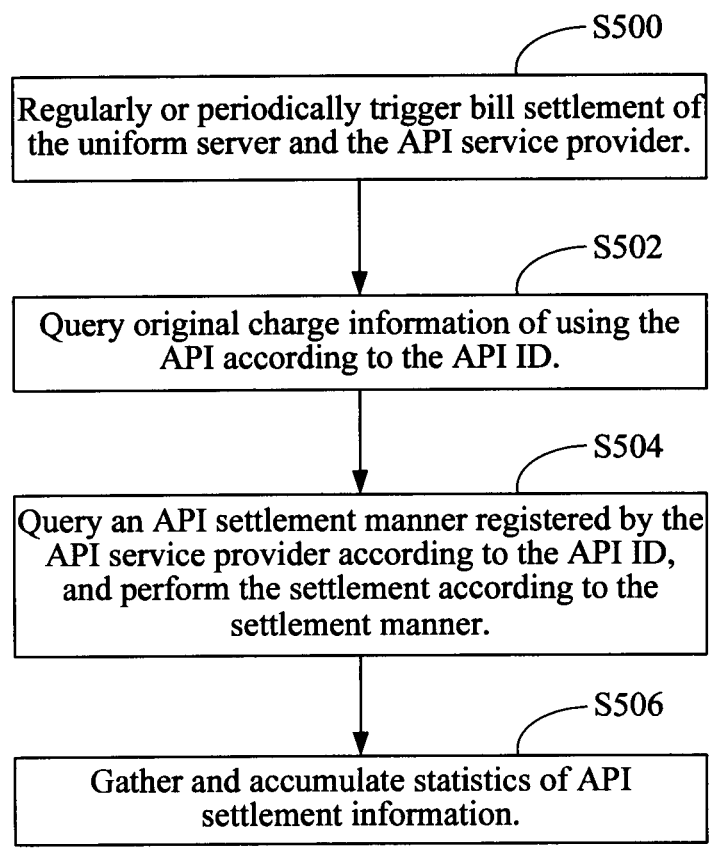
FIG. 5 is a flow chart of a specific embodiment of step S118 in FIG. 1A according to the embodiment of the present invention.

FIG. 5 is a flow chart of a specific embodiment of step S118 in FIG. 1A according to the embodiment of the present invention.

In this embodiment, an authentication method and a settlement method between the server and the API service provider may be determined by performing an enterprise-level negotiation between the server and the API service provider. The involved settlement information may be collected by the server. In the implementation process of FIG. 2, the settlement information may also be obtained by the API service provider gathering statistics. That is, the settlement is performed for the API service provider according to the charging information provided by the API service provider and the API settlement manner registered by the API service provider. The charging information provided by the API service provider includes the API ID, the server ID, and the number of times of the completed service using the API or time for using the API. In this embodiment, the server collecting and obtaining the settlement information is taken as an example for description.

Step S500: Regularly or periodically trigger bill settlement of the server and the API service provider.

Step S502: Query original charging information of using the API according to the API ID.

Step S504: Query an API settlement manner registered by the API service provider according to the API ID, and perform the settlement according to the settlement manner.

Step S506: Gather and accumulate statistics of API settlement information. That is, an accumulated API settlement bill, which may be understood as a total API bill of the API service provider, is obtained.

In this embodiment, after settlement information of the API service provider is obtained, the charge amount of the API service provider is deducted from revenue of the server according to a charge amount in the settlement information as revenue of the API service provider or expense of the server, that is, the charge amount of the API service provider is obtained from the deducted charge amount generated by the user using the Widget.

Definitely, the Widget is designed and developed by a developer with certain efforts, so the developer may also participate in operation at the server, and a certain proportion of amounts in a result after revenue and expense settlement may be distributed to the developer. Definitely, a corresponding charge amount may be distributed from a remaining charge amount to the developer of the Widget according to a utility rate or a market value of the Widget, or a high evaluation level of the user, or popularity. Definitely, the developer may be the operator or another person.

According to the technical solution provided by the embodiment, the server acts as the agent to uniformly collect the charging information generated by the Widget using the API service, so the API service provider does not need to collect the charging information respectively, thereby reducing the complicated operation of the API service provider, and the server acts as the agent to uniformly forward the request for the user using the API service to the API service provider and forward the response for the service request from the API service provider to the user, so the user does not need to perform communication interaction with multiple API service providers respectively, thereby reducing the complicated user operation and improving the user experience.

In addition, the server collects the charging information and the charging policy registered by the Widget, and settles the charge generated by using the API service when the user uses the Widget, so as to avoid the situation that the user needs to perform settlement for each API service provider respectively, thereby reducing the complicated user operation and improving the user experience. Moreover, the API service provider does not need to perform the charging settlement respectively, thereby reducing the complicated operation of the API service provider. The server may also output the composite bill to the user, which enables the user to clearly know the use and charge of the Widget and the API service, thereby bringing better user experience to the user.

Figure 6:
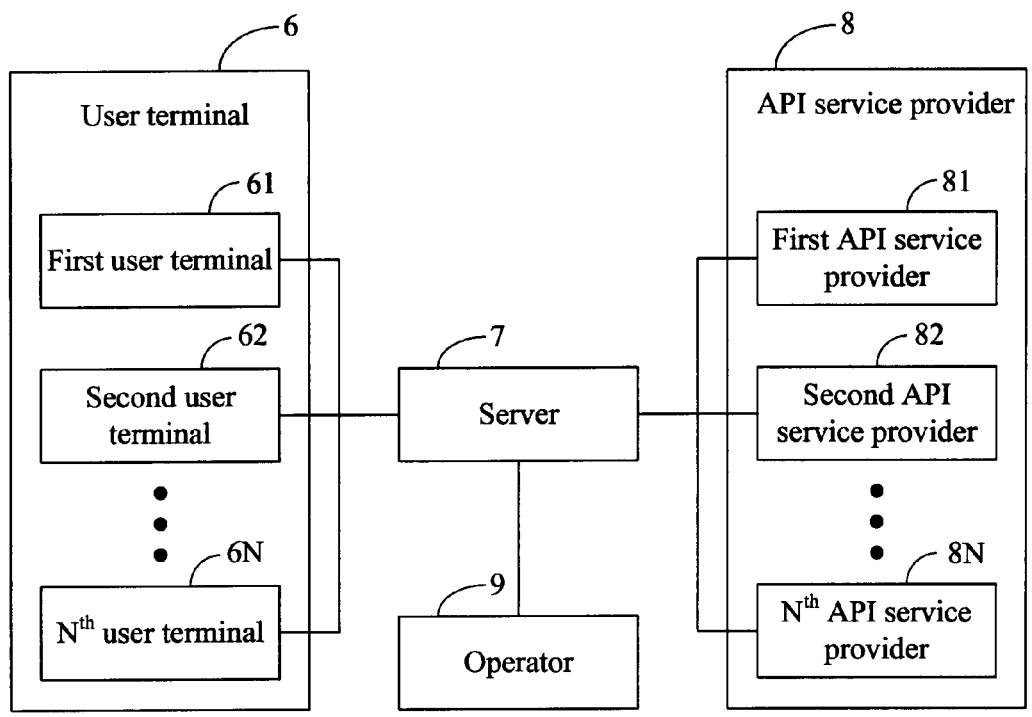
FIG. 6 is a diagram of an application environment of a server according to an embodiment of the present invention.

FIG. 6 is a diagram of an application environment of a server according to an embodiment of the present invention.

In this embodiment, a user terminal 6 is communicatively connected to an API service provider 8 through a server 7, and the server is communicatively connected to an operator 9. The user terminal 6 includes a first user terminal 61, a second user terminal 62, . . . , and an $N^{th}$ user terminal 6N. The API service provider 8 includes a first API service provider 81, a second API service provider 82, . . . , and an $N^{th}$ API service provider 8N. Each user terminal may be installed with multiple Widgets. In this embodiment, the server 7 is configured to receive a service request initiated by the user terminal 6, authenticate and convert the service request, forward the converted service request to the corresponding API service provider 8, and forward a response for the service request returned by the API service provider 8 to the user terminal 6. In this embodiment, the server 7 is further configured to perform settlement for the API service used by the user terminal 6 according to collected charging information and a registered charging policy, and perform settlement with the API service provider 8.

In some application environment, the server 7 and the API service provider 8 may be different service network elements provided by the same actual service provider. First, in an embodiment corresponding to the application, the server 7 may include all service agent functions of the Widget in the embodiment corresponding to FIG. 4, or be similar to the embodiment corresponding to FIG. 1, not including the function of performing the uniform charging settlement for the API service provider. Second, the actual service provider of the server 7 and the API service provider 8 may be the same. At this time, the API server may not include information such as a user and an application of a user terminal, and the information such as the user and the application of the user terminal may be provided by the server 7 for operation. Moreover, in addition to functions mentioned in the embodiments, the server 7 may further include the feature described in the background of the invention, that is, a final service involved in the server 7 may be developed by a third party, especially a free developer, and the developer automatically uploads the final service to the server 7 after developing the final service. That is, in the embodiment, the server 7 provides not only an agent service for the user terminal but also an application upload service oriented to the free developer.

Figure 7:
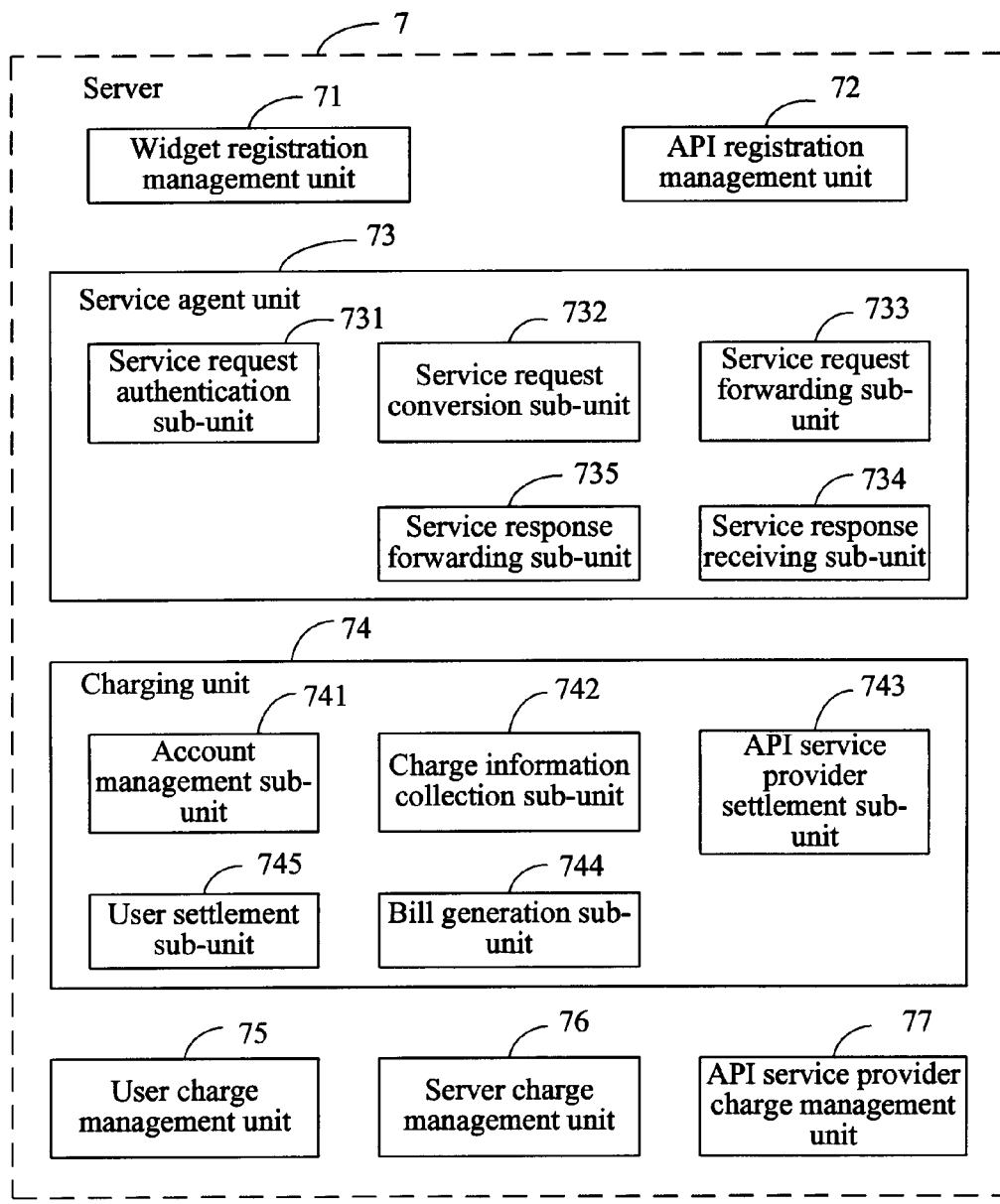
FIG. 7 is a structure diagram of a server according to an embodiment of the present invention.

FIG. 7 is a structure diagram of a server according to an embodiment of the present invention.

In this embodiment, the server 7 includes a Widget registration management unit 71, an API registration management unit 72, a service agent unit 73, a charging unit 74, a user charge management unit 75, a server charge management unit 76, and an API service provider charge management unit 77. In this embodiment, the service agent unit 73 includes a service request authentication sub-unit 731, a service request conversion sub-unit 732, a service request forwarding sub-unit 733, a service response receiving sub-unit 734, and a service response forwarding sub-unit 735. The charging unit 74 includes an account management sub-unit 741, a charging information collection sub-unit 742, an API service provider settlement sub-unit 743, a bill generation sub-unit 744, and a user settlement sub-unit 745.

In this embodiment, the Widget registration management unit 71 is configured to receive registration information of a Widget, that is, to manage a registered Widget on each user terminal. It may also be understood that, when using the user terminal installed with the Widget, a user needs to register the Widget with a server, where information to be registered includes a Widget ID, a Widget charging policy, and a charge API service used by the Widget. Definitely, the charge API service used by the Widget includes an ID of an API used by the Widget. Meanwhile, the user also needs to register on the server to ensure that the user has a use right.

The API registration management unit 72 is configured to receive registration information of an API service provider, where the registration information includes a settlement manner of the API, that is, the API for managing the API service provider to register on the server.

In this embodiment, when the user needs to enjoy a service through the Widget in the user terminal 6, the user terminal 6 is required to initiate a service request for using the API. In this embodiment, the service request authentication sub-unit 731 is configured to receive the service request initiated by the user terminal 6 and authenticate the service request. In this embodiment, the service request includes authentication information, where the authentication information includes a user ID, the Widget ID, and an API ID. In this embodiment, the Widget ID is an ID of the Widget used by the user. The API ID is the ID of the API that the user needs to request using. Definitely, the user terminal may include IP information of the user.

In this embodiment, the service request authentication sub-unit 731 is further configured to determine that the user is a registered user of the server and has a right to use the server according to the user ID in the service request. In this embodiment, it may be queried whether the user ID exists in user IDs registered on the server. Then, the service request authentication sub-unit 731 is further configured to determine that the Widget used by the user is already registered on the server according to the Widget ID in the service request. In this embodiment, it may be queried whether the Widget ID exists in Widgets registered on the server. Then, the service request authentication sub-unit 731 is further configured to compare the Widget ID and the API ID in the service request with registration information of the Widget, and determine that the Widget in service request has a right to use the API.

The service request conversion sub-unit 732 is configured to convert the service request of the user after the service request authentication sub-unit 731 authenticates the service request successfully. In this embodiment, a conversion manner is: removing the authentication information in the service request of the original user, and adding authentication information negotiated between the server and the API service provider. Two different manners may be as follows.

A first manner is authentication through a user name and a password, where the user name and the password registered by the server with the API service provider are added in the service request.

A second manner is authentication through an IP address, where in the service request, the IP information of the original user is removed, and IP information of the server is added.

The service request forwarding sub-unit 733 is configured to forward the service request converted by the service request conversion sub-unit 732 to a corresponding API service provider. In this embodiment, after receiving the service request, the API service provider returns a response for the service request to the server.

The service response receiving sub-unit 734 is further configured to receive a response for the service request from the API service provider.

The service response forwarding sub-unit 735 is further configured to forward the response received by the service response receiving sub-unit 734 to the user terminal. The response is information generated by the API service provider processing the service request. For example, if the user sends a service request for a weather forecast, the API service provider returns a result of the weather forecast to the user terminal.

In this embodiment, after the service request authentication sub-unit 731 authenticates the service request successfully, the charging information collection sub-unit 742 in the charging unit 741 is configured to determine whether charging information collection needs to be triggered, and when it is determined that the charging information collection needs to be triggered, collect and record the charging information. The charging information may include the user ID, the Widget ID, and the API ID, or definitely, may further include service starting time and service ending time, and the number of times of the completed service. In this embodiment, the collected charging information may be regarded as original charging information for generating the bill. For details of collecting the charging information, reference may be made to FIG. 2, and the details are not described here again.

The account management sub-unit 741 is configured to manage a user account registered on the server.

The user settlement sub-unit 745 is configured to generate a bill of the user terminal according to the charging information recorded and collected by the charging information collection sub-unit 742 and a charging policy in the Widget registration management unit 71, that is, to perform settlement for the API service used by the user terminal. In this embodiment, the user settlement sub-unit 745 is further configured to query all original charging information of the user in a certain period of time according to the user ID, classify the original charging information of the user according to the Widget ID, query the charging policy registered by the Widget according to the Widget ID, and complete Widget-related charging according to the charging policy.

The bill generation sub-unit 744 is configured to output a bill according to a settlement result of the user settlement sub-unit 745. In this embodiment, the bill generation sub-unit 744 is configured to output the bill of the user to the user according to a query bill request of the user.

In this embodiment, after the charging settlement for the API service used by the Widget is performed, the server charge management unit 76 is configured to deduct a charge amount generated by the user using the Widget from the user charge management unit 75 according to charging settlement information of the user settlement sub-unit 745, where the settlement information includes the user ID and the amount. The user charge management unit 75 is configured to manage the charge amount of the user. In this embodiment, the deducted charge amount generated by the user using the Widget may be regarded as revenue of the server.

In this embodiment, the user settlement sub-unit 745 may also send the charging settlement information to an operator to notify the operator of deducting a charge amount of the user from an operator account, where the settlement information includes the user ID, a server ID, and the amount. The server charge management unit 76 receives the charge amount of the user deducted by the operator from the operator account. In this embodiment, the deducted charge amount generated by the user using the Widget may be regarded as the revenue of the server.

The API service provider settlement sub-unit 743 is configured to perform API settlement according to the charging information collected by the charging information collection sub-unit 742 and a settlement manner registered by the API. In this embodiment, specific operation is: query the original charging information of using the API according to the API ID, query the settlement manner registered by the API according to the API ID, and perform the settlement according to the settlement manner.

In this embodiment, the API service provider settlement sub-unit 743 is further configured to perform settlement for the API service provider according to the charging information provided by the API service provider and the API settlement manner registered by the API service provider, where the charging information provided by the API service provider includes the API ID, the server ID, and the number of times of the completed service using the API, or starting time and ending time for using the API.

In this embodiment, after the settlement is performed for the API service provider, the API service provider charge management unit 77 is configured to deduct a charge amount of the API service provider from a charge amount managed by the server charge management unit 76 as revenue of the API service provider or an expense of the server according to a charge amount obtained after the API service provider settlement sub-unit 743 perform the settlement for the API service provider, that is, the charge amount of the API service provider is obtained from the deducted charge amount generated by the user using the Widget.

The API service provider charge management unit 77 is further configured to obtain the charge amount of the API service provider, and distribute the obtained charge amount of the API service provider to the API service provider.

Definitely, the Widget is designed and developed by a developer with certain efforts, so the developer may also participate in operation at the server, and a certain proportion of amounts in a result after revenue and expense settlement may be distributed to the developer. Definitely, a corresponding charge amount may be distributed from a remaining charge amount to the developer of the Widget according to a utility rate or a market value of the Widget, or a high evaluation of the user, or popularity. Definitely, the developer may be the operator or another person. In this embodiment, the server charge management unit 76 is further configured to distribute a corresponding charge amount from a remaining charge amount to the developer of the Widget according to the utility rate or the market value of the Widget, or the high evaluation of the user, or the popularity.

The bill generation sub-unit 744 is further configured to gather and accumulate statistics of API settlement information. That is, an accumulated API settlement bill, which may be understood as a total API bill, is obtained.

According to the technical solution provided by the embodiment, the server acts as the agent to uniformly collect the charging information generated by the Widget using the API service, so the API service provider does not need to collect the charging information respectively, thereby reducing the complicated operation of the API service provider, and the server acts as the agent to uniformly forward the request for the user using the API service to the API service provider and forward the response for the service request from the API service provider to the user, so the user does not need to perform communication interaction with multiple API service providers respectively, thereby reducing the complicated user operation and bringing better user experience to the user.

In addition, the server collects the charging information and the charging policy registered by the Widget, and settles the charge generated by using the API service when the user uses the Widget, so as to avoid the situation that the user needs to perform settlement for each API service provider respectively, thereby reducing the complicated user operation and bringing better user experience. Moreover, the API service provider does not need to perform the charging settlement respectively, thereby reducing the complicated operation of the API service provider. The server may also output the composite bill to the user, which enables the user to clearly know the use and charge of the Widget and the API service, thereby bringing better user experience to the user.

Persons of ordinary skill in the art may understand that, all or a part of processes in the method according to the embodiments may be accomplished by relevant hardware under instructions of a computer program. The program may be stored in a computer-readable storage medium. When the program is run, the flow of the method according to the embodiments is performed. The storage medium may be a magnetic disk, an optical disk, a read-only memory (ROM), a random access memory (RAM), and the like.

The above is merely several embodiments of the present invention. Persons skilled in the art may make various modifications and variations to the present invention according to the disclosure of the application document without departing from the spirit and scope of the present invention. Persons of ordinary skill in the art may understand that, the embodiments or features of different embodiments may be combined with each other to form new embodiments without any collision.

What is claimed is:

1. A method for an agent service applied to a Widget, comprising:
    receiving a service request for the Widget using an Application Programming Interface (API) initiated by a user terminal;
    forwarding the service request to an API service provider;
    forwarding a response for the service request from the API service provider to the user terminal;
    determining whether charging in for an API service is performed according to a service duration;
    collecting charging information generated by the Widget using the API service, wherein the charging information comprises a service starting timed a service vice ending time when the charging for the API service is performed according to the service duration, and wherein the charging information comprises a number of times of completed service when the charging for the API service is not performed according to the service duration; and
    recording the charging information, wherein the charging information, together with a charging policy registered by the Widget, is used to perform uniform charging for the API service used by the Widget.

2. The method according to claim 1, wherein forwarding the service request to the API service provider comprises:
    authenticating the service request;
    converting the service request after authentication succeeds; and
    forwarding the converted service request to the API service provider.

3. The method according to claim 2, wherein the service request comprises authentication information, wherein the authentication information comprises a user identifier (ID), a Widget ID, and an API ID used by the Widget, and wherein authenticating the service request comprises:
    determining that a user of the user terminal is a registered user and has a use right according to the user ID;
    determining that the Widget used by the user is already registered according to the Widget ID;
    comparing the Widget ID and the API ID with registration information of the Widget; and
    determining that the Widget has a right to use the API.

4. The method according to claim 1, further comprising:
    querying charging information of a user of the user terminal in a certain period of time according to a user identifier (ID);
    classifying the charging information of the user in the certain period of time according to a Widget ID;
    querying the charging policy registered by the Widget according to the Widget ID; and
    performing charging settlement for the API service used by the Widget according to the charging policy and the classified charging information.

5. The method according to claim 4, further comprising:
    performing a rating process for charging settlement information; and
    outputting a composite bill.

6. The method according to claim 1, further comprising performing settlement for the API service provider according to the charging information and an API settlement manner registered by the API service provider.

7. The method according to claim 6, wherein performing the settlement for the API service provider according to the charging information and the settlement manner registered by the API comprises:
    querying charging information collected when using the API according to an API identifier (ID);
    querying the API settlement mariner registered by the API service provider according to the API ID;
    performing the settlement according to the settlement manner; and
    gathering and accumulating statistics of the settlement information of the API service provider.

8. The method according to claim 6, further comprising:
    deducting a charge amount generated by a user using the Widget according to charging settlement information, wherein the charging settlement information comprises a user identifier (ID) and the charge amount;
    obtaining a charge amount of the API service provider from the deducted charge amount generated by the user using the Widget according to a charge amount generated after the settlement is performed for the API service provider; and
    distributing the obtained charge amount of the API service provider to the API service provider.

9. The method according to claim 1, further comprising performing settlement for the API service provider according to the charging information provided by the API service provider and API settlement manner registered by the API service provider, wherein the charging information provided by the API service provider comprises the API identifier (ID), a server ID, and the number of times of completed service using the API, or comprises the API ID, the server ID, and time for using the API.

10. The method according to claim 1, wherein the Widget uses the API service and a plurality of other API services, wherein the API service provider collects charging information for the API service and the plurality of other API services, and wherein the API service provider performs charging for the API service and the plurality of other API services at a same time.

11. A server for an agent service applied to a Widget, wherein the server is communicatively connected to multiple user terminals and multiple Application Programming Interface (API) service providers respectively, comprising:
    a service agent unit; and
    a charging unit,
    wherein the service agent unit is configured to receive a service request for the Widget using an API initiated by a user terminal, forward the service request to an API service provider, and forward a response for the service request from the API service provider to the user terminal, and
    wherein the charging unit is configured to collect charging information generated by the Widget using an API service and record the charging information after the service agent unit receives the service request, wherein the charging information, together with a charging policy registered by the Widget, is used to perform uniform charging for the API service used by the Widget, wherein the charging information comprises a service starting time and a service ending time when charging for the API service is performed according to a service duration and wherein the charging information comprises a number of times of completed service when the charging for the API service is not performed according to the service duration.

12. The server according to claim 11, wherein the service agent unit is further configured to authenticate the service request and convert the service request after authentication succeeds.

13. The server according to claim 11, wherein the service request comprises authentication information, wherein the authentication information comprises a user identifier (ID), a Widget ID, and an API ID used by the Widget, and wherein the service agent unit is further configured to determine that a user of the user terminal is a registered user and has a use right according to the user ID, determine that the Widget used by the user is already registered according to the Widget ID, compare the Widget ID and the API ID with registration information of the Widget, and determine that the Widget has a right to use the API.

14. The server according to claim 11, wherein the charging unit is further configured to query charging information of a user in a certain period of time according to a user identifier (ID), classify the charging information of the user in the certain period of time according to a Widget ID, query the charging policy registered by the Widget according to the Widget ID, and perform charging settlement for the API service used by the Widget according to the charging policy and the classified charging information.

15. The server according to claim 11, further comprising:
a user charge management unit configured to manage a charge amount of the user; and
a server charge management unit configured to deduct a charge amount generated by a user using the Widget from the charge amount of the user managed by the user charge management unit according to charging settlement information of the charging unit, wherein the charging settlement information comprises a user identifier (ID) and the amount.

16. The server according to claim 15, further comprising an API service provider charge management unit configured to obtain a charge amount of the API service provider from the charge amount managed by the server charge management unit according to a charge amount generated after the charging unit performs settlement for the API service provider, and distribute the obtained charge amount of the API service provider to the API service provider.

17. The server according to claim 11, wherein the server is further communicatively connected to an operator, wherein the charging unit is further configured to send charging settlement information to the operator to notify the operator of deducting a charge amount of a user from an operator account, wherein the settlement information comprises a user identifier (ID), a server ID, and the amount, and wherein the server further comprises a server charge management unit that is configured to receive the charge amount of the user from the operator account deducted by the operator.

18. The server according to claim 11, wherein the charging unit is further configured to perform settlement for the API service provider according to the charging information and an API settlement manner registered by the API service provider.

19. The server according to claim 11, wherein the charging unit is further configured to perform settlement for the API service provider according to the charging information provided by the API service provider and an API settlement manner registered by the API service provider, and wherein the charging information provided by the API service provider comprises an API identifier (ID), a server ID, and the number of times of completed service using the API or the service starting time and the service ending time for using the API service.

20. The server according to claim 11, wherein the Widget uses the API service and a plurality of other API services, wherein the API service provider collects charging information for the API service and the plurality of other API services, and wherein the API service provider performs charging for the API service and the plurality of other API services at a same time.

\* \* \* \* \*

UNITED STATES PATENT AND TRADEMARK OFFICE
CERTIFICATE OF CORRECTION

PATENT NO. : 8,832,250 B2  Page 1 of 1
APPLICATION NO. : 13/338375
DATED : September 9, 2014
INVENTOR(S) : Zhihong Qiu et al.

It is certified that error appears in the above-identified patent and that said Letters Patent is hereby corrected as shown below:

IN THE CLAIMS:

Column 15, Line 16, Claim 1 should read:

A method for an agent service applied to a Widget, comprising:
  receiving a service request for the Widget using an Application Programming Interface (API) initiated by a user terminal;
  forwarding the service request to an API service provider;
  forwarding a response for the service request from the API service provider to the user terminal;
  determining whether charging for an API service is performed according to a service duration;
  collecting charging information generated by the Widget using the API service, wherein the charging information comprises a service starting time and a service ending time when the charging for the API service is performed according to the service duration, and wherein the charging information comprises a number of times of completed service when the charging for the API service is not performed according to the service duration; and
  recording the charging information, wherein the charging information, together with a charging policy registered by the Widget, is used to perform uniform charging for the API service used by the Widget.

Signed and Sealed this
Second Day of December, 2014

Michelle K. Lee
*Deputy Director of the United States Patent and Trademark Office*